(12) United States Patent
Varadarajan

(10) Patent No.: US 8,965,850 B2
(45) Date of Patent: Feb. 24, 2015

(54) METHOD OF AND SYSTEM FOR MERGING, STORING AND RETRIEVING INCREMENTAL BACKUP DATA

(71) Applicant: Srinidhi Varadarajan, Great Falls, VA (US)

(72) Inventor: Srinidhi Varadarajan, Great Falls, VA (US)

(73) Assignee: Dell Software Inc., Aliso Viejo, CA (US)

( * ) Notice: Subject to any disclaimer, the term of this patent is extended or adjusted under 35 U.S.C. 154(b) by 36 days.

(21) Appl. No.: 13/678,881

(22) Filed: Nov. 16, 2012

(65) Prior Publication Data

US 2013/0132346 A1    May 23, 2013

Related U.S. Application Data

(60) Provisional application No. 61/561,621, filed on Nov. 18, 2011.

(51) Int. Cl.
*G06F 17/30* (2006.01)
*G06F 11/14* (2006.01)

(52) U.S. Cl.
CPC ........ *G06F 11/1448* (2013.01); *G06F 2201/84* (2013.01)
USPC ........... 707/646; 707/649; 707/673; 707/685; 707/820; 707/830

(58) Field of Classification Search
CPC ............ G06F 2201/84; G06F 11/1451; G06F 11/1448; G06F 11/1466; G06F 11/1469; G06F 11/1461; Y10S 707/99953; Y10S 707/99955

USPC ......... 707/624, 645–646, 649, 673, 685, 820, 707/830
See application file for complete search history.

(56) References Cited

U.S. PATENT DOCUMENTS

| 4,631,673 | A | 12/1986 | Haas et al. |
| 5,287,496 | A | 2/1994 | Chen et al. |
| 6,192,377 | B1 | 2/2001 | Ganesh et al. |
| 6,434,681 | B1 | 8/2002 | Armangau |
| 6,604,118 | B2 | 8/2003 | Kleiman et al. |

(Continued)

FOREIGN PATENT DOCUMENTS

| CN | 1567262 A | 1/2005 |
| EP | 0501180 A2 | 9/1992 |

(Continued)

OTHER PUBLICATIONS

Young, Lee W., "International Search Report" for PCT/US12/65500, as mailed Jan. 29, 2013, 2 pages.

(Continued)

*Primary Examiner* — Hanh Thai
(74) *Attorney, Agent, or Firm* — Winstead PC

(57) ABSTRACT

A method of managing backup data. The method includes accessing, via a backup manager, index data of an initial snapshot and accessing, via the backup manager, index data of a subsequent snapshot. The method further includes determining, via the backup manager, whether the index data of the subsequent snapshot is different from the index data of the initial snapshot. Responsive to a determination that the index data of the subsequent snapshot is different from the index data of the initial snapshot, creating an updated index data and creating an updated snapshot with the updated index data.

17 Claims, 4 Drawing Sheets

(56) References Cited

U.S. PATENT DOCUMENTS

| | | | |
|---|---|---|---|
| 6,912,645 B2 | 6/2005 | Dorward et al. | |
| 6,934,822 B2 | 8/2005 | Armangau et al. | |
| 7,039,663 B1 | 5/2006 | Federwisch et al. | |
| 7,047,380 B2 | 5/2006 | Tormasov et al. | |
| 7,111,136 B2 | 9/2006 | Yamagami | |
| 7,162,601 B2 | 1/2007 | Yamagami | |
| 7,171,538 B2 | 1/2007 | Kisley et al. | |
| 7,243,197 B2 | 7/2007 | Yamagami | |
| 7,246,211 B1 | 7/2007 | Beloussov et al. | |
| 7,376,790 B2* | 5/2008 | Lango et al. | 711/126 |
| 7,464,100 B2* | 12/2008 | Schreter | 1/1 |
| 8,195,623 B2 | 6/2012 | Prahlad et al. | |
| 8,200,638 B1* | 6/2012 | Zheng et al. | 707/679 |
| 8,352,431 B1* | 1/2013 | Protopopov et al. | 707/640 |
| 8,627,500 B2* | 1/2014 | Rogel et al. | 726/28 |
| 2003/0084038 A1 | 5/2003 | Balogh et al. | |
| 2003/0084039 A1 | 5/2003 | Balogh | |
| 2003/0084057 A1 | 5/2003 | Balogh | |
| 2003/0084074 A1 | 5/2003 | Balogh et al. | |
| 2003/0084075 A1 | 5/2003 | Balogh et al. | |
| 2003/0131253 A1 | 7/2003 | Martin et al. | |
| 2003/0167380 A1 | 9/2003 | Green et al. | |
| 2004/0010487 A1 | 1/2004 | Prahlad et al. | |
| 2004/0030727 A1 | 2/2004 | Armangau et al. | |
| 2004/0243775 A1* | 12/2004 | Coulter et al. | 711/162 |
| 2005/0055354 A1 | 3/2005 | Thompson et al. | |
| 2005/0102297 A1 | 5/2005 | Lloyd et al. | |
| 2005/0149472 A1* | 7/2005 | Schreter | 707/1 |
| 2005/0165828 A1* | 7/2005 | Lango et al. | 707/102 |
| 2005/0187992 A1* | 8/2005 | Prahlad et al. | 707/204 |
| 2005/0193026 A1* | 9/2005 | Prahlad et al. | 707/200 |
| 2006/0041727 A1 | 2/2006 | Adkins et al. | |
| 2006/0047926 A1 | 3/2006 | Zheng | |
| 2006/0047996 A1 | 3/2006 | Anderson et al. | |
| 2006/0107006 A1 | 5/2006 | Green et al. | |
| 2006/0265489 A1 | 11/2006 | Moore | |
| 2007/0043790 A1 | 2/2007 | Kryger | |
| 2007/0185940 A1* | 8/2007 | Prahlad et al. | 707/204 |
| 2008/0091655 A1 | 4/2008 | Gokhale et al. | |
| 2008/0222219 A1 | 9/2008 | Varadarajan | |
| 2009/0182963 A1* | 7/2009 | Prahlad et al. | 711/162 |
| 2009/0240748 A1* | 9/2009 | Prahlad et al. | 707/204 |
| 2010/0287141 A1* | 11/2010 | Prahlad et al. | 707/645 |
| 2011/0066599 A1* | 3/2011 | Prahlad et al. | 707/679 |
| 2011/0173404 A1 | 7/2011 | Eastman et al. | |
| 2012/0284233 A1* | 11/2012 | Otani | 707/649 |

FOREIGN PATENT DOCUMENTS

| | | |
|---|---|---|
| WO | WO-03/038596 A1 | 5/2003 |
| WO | WO-2005/048085 A2 | 5/2005 |
| WO | WO-2007/030304 A2 | 3/2007 |

OTHER PUBLICATIONS

Kim, Sae Byul, "International Search Report" for PCT/US2008/055867, as mailed Jul. 28, 2008, 1 page.

Xie, G., et al., "Esnap—A Cached Dependent Snapshot System," Proceedings of the 2007 IEEE International Conference on Integration Technology, pp. 783-788, Mar. 20-24, 2007.

"Volume Snapshot Manager," White Paper, StorageCraft Technology Corporation, pp. 1-6, Draper, 2004.

Shrira, I., et al., "Thresher: An Efficient Storage Manager for Copy-on-write Snapshots," May 2006.

Application Software Partner Engineering (ASPE), "Sun Storage Tek Data Volume Copy and Sun Storage Tek Data Snapshot Usage with Oracle Databases," Sun Microsystems, Inc., 2005.

Moh, C., "Snapshots in a Distributed Persistent Object Storage System," Department of Electrical Engineering, Massachusetts Institute of Technology, Massachusetts, pp. 1-62, May 27, 2003.

"Snapshots and Data Protection: The Dot Hill Difference," White Paper, Dot Hill, pp. 1-17, 2005.

Shrira, L. et al., "SNAP: Efficient Snapshots for Back-in-Time Execution," Proceedings of the 21st International Conference on Data Engineering, IEEE Computer Society, 2005.

Kim, Y., et al., "Snapshot Technique Using Snapshot Status Table for Shared Storage Supporting Large Capacity," Dept. of Computer System, Electronics and Telecommunications Research Institute, pp. 677-682, 2004.

Krishnan, G., "Rapid Restores from Data Disasters," Computer Technology Review, pp. 1-4, Feb. 1, 2004.

Xiao, W., et al., "Implementation and Performance Evaluation of Two Snapshot Methods on iSCSI Target Storages," pp. 1-11, undated.

Bertrand, C., "Examining Hitachi Copy-on-Write Snapshot Software Capabilities," White Paper, Hitachi Data Systems, pp. 1-29, Aug. 2004.

"Data Protection Strategies for Network Appliance Storage Systems," Network Appliance, Inc., pp. 1-29, Aug. 2006.

Siddha, S., et al., "A Persistent Snapshot Device Driver for Linux," Proceedings of the 5th Annual Linux Showcase & Conference, Nov. 5-10, 2001.

Ji, M., "Instant Snapshots in a Federated Array of Bricks," Jan. 28, 2005, HP Laboratories, Internet Systems and Storage Laboratory, pp. 1-21, Jan. 28, 2005.

* cited by examiner

METHOD OF AND SYSTEM FOR MERGING, STORING AND RETRIEVING INCREMENTAL BACKUP DATA

CROSS-REFERENCE TO RELATED APPLICATIONS

This patent application claims priority from, and incorporates by reference, U.S. Patent Application No. 61/561,621, filed on Nov. 18, 2011.

BACKGROUND OF THE INVENTION

1. Technical Field

The present invention relates generally to computer systems and more particularly, but not by way of limitation, to methods and systems for efficiently merging, storing and retrieving incremental backup data.

2. History of Related Art

Reliable data backup is an important requirement of computer systems today. Traditional backup systems typically perform backup by copying file systems onto data storage media such as tapes or optical disks. For file systems containing large amounts of data, the copying process often takes a long time. Therefore, traditionally backups have been performed relatively infrequently, such as on daily or weekly basis. More recently, "snapshot" type backup systems and/or programs have been provided, which are capable of storing backup data more frequently, in some cases as often as a user requests. However, using backup data to restore a particular file or other stored object such as, for example, a particular prior version of a file, a user is required to undergo lengthy restore operations. Each backup data set in which the file might be included is used to "restore" the source data set to a state associated with the backup data, and then the file system of the restored data set traversed to search for the desired file. This restore and browse approach consumes excessive time and resources, particularly with backup data being generated more and more frequently, as "snapshot" and related technologies permit. It would be useful, therefore, to have a way to enable users to more quickly and easily access specific files and other objects from backup data.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

A method of managing backup data. The method includes accessing, via a backup manager, index data of an initial snapshot and accessing, via the backup manager, index data of a subsequent snapshot. The method further includes determining, via the backup manager, whether the index data of the subsequent snapshot is different from the index data of the initial snapshot. Responsive to a determination that the index data of the subsequent snapshot is different from the index data of the initial snapshot, creating an updated index data and creating an updated snapshot with the updated index data.

An information handling system. The system includes a backup manager interoperably coupled to a client and adapted to provide instructions to take an initial snapshot and a subsequent snapshot of data sets at predetermined intervals and create an initial index data and a subsequent index data. The backup manager accesses the initial index data and the subsequent index data and creates an updated snapshot and an updated index data responsive to a determination that the subsequent index data is different from the initial index data.

An article of manufacture for managing backup data includes at least one computer readable medium and processor instructions contained on the at least one computer readable medium, the processor instructions configured to be readable from the at least one computer readable medium by at least one processor and thereby cause the at least one processor to operate as to perform accessing, via a backup manager, index data of an initial snapshot, accessing, via the backup manager, index data of a subsequent snapshot and determining, via the backup manager, whether the index data of the subsequent snapshot is different from the index data of the initial snapshot. Responsive to a determination that the index data of the subsequent snapshot is different from the index data of the initial snapshot, creating an updated index data and creating an updated snapshot with the updated index data.

BRIEF DESCRIPTION OF THE DRAWINGS

A more complete understanding of the method and system of the present invention may be obtained by reference to the following Detailed Description when taken in conjunction with the accompanying Drawings wherein.

DESCRIPTION OF THE EXEMPLARY EMBODIMENTS

Embodiment(s) of the invention will now be described more fully with reference to the accompanying Drawings. The invention may, however, be embodied in many different forms and should not be construed as limited to the embodiment(s) set forth herein. The invention should only be considered limited by the claims as they now exist and the equivalents thereof.

As the volume of backup data continues to grow exponentially, mechanisms are needed to efficiently archive and retrieve data. Modern backup processes include, for example, image-based backup and incremental backup. Image-based backup process is a backup process for a computer or virtual machine (VM) that creates a copy of an operating system (OS) and all the data associated with it, including system states and application configurations. The backup is saved as a single file that is called an image. In contrast, incremental backup is a backup process that only copies files that have changed since the last backup. For example, if a full backup was performed on Monday, Tuesday's incremental backup will only back up files that have changed since Monday's backup. Wednesday's incremental backup will only back up files that have changed since Tuesday's incremental backup. At least one advantage of incremental backup is that fewer files are backed up daily, allowing for shorter backup windows.

Figure 1:
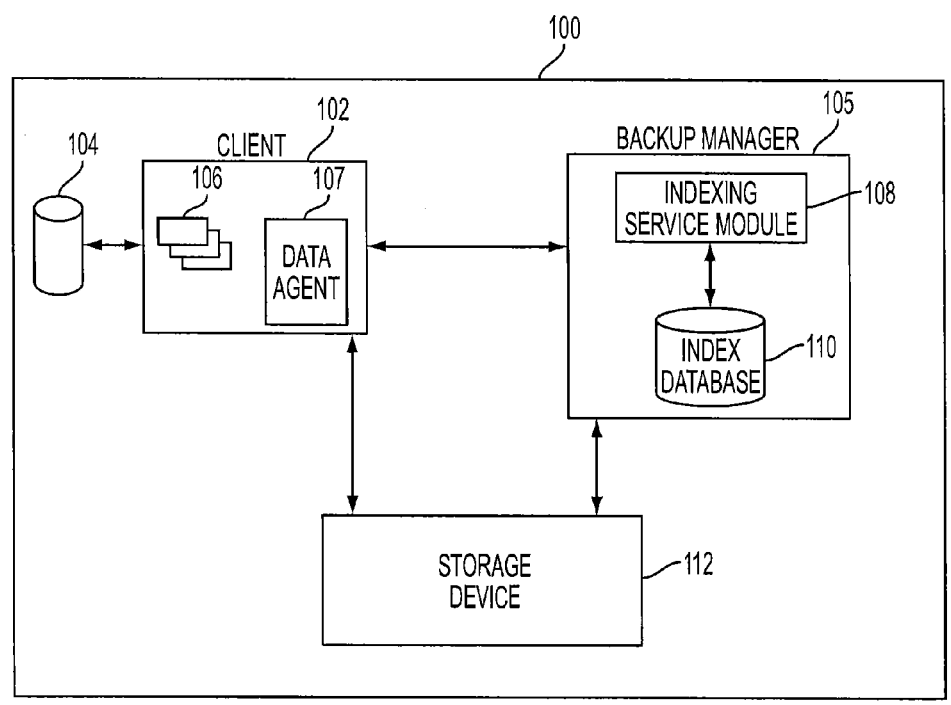
FIG. 1 is a block diagram of a backup system for performing backup operations according to an exemplary embodiment.

FIG. 1 is a block diagram of a backup system for performing backup operations according to an exemplary embodiment. A backup system 100 includes a client 102, an information store 104, a backup manager 105, and a storage device 112. The client 102 includes at least one data agent 107. In a typical embodiment, the data agent 107 may be implemented as, for example, a computer code, a hardware device, a software/hardware combination or any other appropriate system. Typically, the data agent 107 is responsible for retrieving data from an information store 104. The data stored in the information store 104 is subject to backup operations and includes systematically organized data sets such as, for example, files, directories, databases, or other appropriate data objects. The data agent 107 provides an interface to the information store 104 to execute data backup which includes, for example, copying data, archiving data, and taking a plurality of snapshots 106 of the data sets.

In a typical embodiment, the backup manager 105 may be, for example, a software module or an application that coordinates and controls other components of the backup system 100 such as, for example, the client 102 and the storage device 112. The backup manager 105 includes, for example, an indexing service module 108 and an index database 110. In a typical embodiment, the indexing service module 108 manages the index database 110. The backup manager 105 communicates with the data agent 107 to control and manage backup operations such as, for example, snapshot creation, data migration, data recovery, and other backup operations. According to exemplary embodiments, backup data files may be stored in at least one of the information store 104, the index database 110, and the storage device 112. In a typical embodiment, the storage device 112 may be an object-oriented database such as, for example, an Objectstore database. The Objectstore database is a commercial object database designed to handle data created by applications that use object-oriented programming techniques.

In the example illustrated in FIG. 1, the backup system 100 includes data subject to backup operations. For example, data for backup includes various types of systematically organized data sets comprised of files, directories, databases, or other appropriate data objects. In a typical embodiment, the data files for backup may be located in, for example, the information store 104. According to exemplary embodiment, a plurality of snapshots 106 of the data sets are taken at various times. A snapshot, as used herein, refers to a virtual copy of a file or device and imitates the way a file or device looked at a precise time the snapshot was taken. A snapshot is not a copy of the data sets, only a picture in time of how the data sets were organized. In a typical embodiment, snapshots can be taken at scheduled intervals and provide a consistent view of the data sets for backup operations.

Various techniques for taking snapshots are employed in different system implementations. For example, in some systems, a special purpose device driver duplicates the data sets on multiple disks as the data sets are created or modified. When a system issues a command to take a snapshot, the data set on a designated disk is preserved and serves as a snapshot of the data set for backup purposes. The maximum number of snapshots depends on the implementation of the backup system. Different snapshots may be identified using, for example, version numbers, time stamp, or other appropriate identification techniques. In some embodiments, to make room for new snapshots, older snapshots may be deleted or overwritten.

According to exemplary embodiments, the backup manager 105 issues a command to take a snapshot 106 of data sets within the information store 104 at predetermined intervals such as, for example, every thirty minutes. The backup manager 105 may further implement a rule, policy, or set of instructions that require snapshots 106 to be taken of the data sets that have changed since the initial snapshot 106. As such, subsequent snapshots 106 copy the changed data sets only. In a typical embodiment, the data agent 107 monitors the data sets in the information store 104 for any changes. When changes in the data sets are identified, the data sets are opened and their contents indexed by the indexing service module 108.

In a typical embodiment, the indexing service module 108 manages the index database 110. The index database 110 includes index data that corresponds to information about data objects in the plurality of snapshots 106. The index data provides the backup system 100 with an efficient mechanism for locating, browsing, searching or otherwise retrieving data objects stored in the plurality of snapshots 106. In a typical embodiment, the indexing service module 108 is configured to update index data within the index database 110 based on modifications to the data objects in the plurality of snapshots 106.

In order to avoid growth in storage size, backup systems such as, for example, the backup system 100, employ a retention policy. For example, consider a backup system that takes incremental snapshots every 15 minutes or 96 incremental backups a day. In such a setup, an organizations retention policy may state that backups that are two weeks old should be reduced to 30 minutes resolutions or backups that are one month old should be reduced to one hour resolutions. In addition, the retention policy may further state that backups that are three month old should be reduced to one day resolutions. Such retention policies of reducing the snapshot resolution results in significant reduction in a number of duplicate copies of disk blocks. This is achieved by merging higher resolution snapshots into single lower resolution snapshots. Merging higher resolution snapshots into single lower resolution snapshots is referred to as a rollup operation.

To implement a rollup operation, the backup systems read all the index data in a set of consecutive snapshots, where the index data identifies a particular disk page that has changed in that snapshot and a location of the contents of a disk page in the corresponding snapshot data file. Next, the rollup operation writes out a latest copy of the disk page to a new snapshot data file and its corresponding index data into a new snapshot index file. This operation proceeds until all snapshot index data entries in the set of consecutive snapshots have been exhausted. The approach disclosed above to implement a retention policy is expensive in terms of the number of storage read and write operations required. While index data entries are small (e.g., a few bytes), disk pages are typically quite large (e.g., several hundreds of bytes to tens/hundreds of kilobytes). The reading of disk pages and writing them into new snapshot files represents a very expensive operation in the rollup process and such retention policy induced merge operations typically take over eight hours for modest size backup operations.

A fundamental unit of storage in a filesystem is a file that is configured to store an arbitrarily large amount of data. Filesystems maintain a significant amount of metadata to track contents of each file. As such, filesystems are not suited for storing small pieces of data. In contrast to filesystems, in an object store, a fundamental unit of abstraction is an object that presents a fixed amount of data. Object stores provide methods to create, read, or write entire objects. By being more restrictive that filesystems, object stores require significantly less metadata to represent an object and are highly efficient for storing small data.

In order to merge contents of two files in a filesystem, the contents of each file are read and written to a third file even if the contents of the two files do not change. This results in extremely high IO load making the rollup operation highly inefficient. To create an efficient mechanism for a rollup operation, exemplary embodiments utilize the efficiency of object stores in storing small units of data. According to exemplary embodiment, each disk page is stored as a unique object identified by an object identifier in the object store. Accordingly, the snapshot index file associates a changed page to an object in the object store. Exemplary embodiment utilizing object stores for the rollup operation now involves creating a new mapping between disk pages and the objects identifiers of objects containing their data. As such, the exemplary rollup operation does not require reading or writing of the objects themselves, but merely their identifiers. Since identifiers are thousands of times smaller than the contents of the objects they reference, the exemplary rollup operation is correspondingly thousands of times faster than the current backup systems.

In an alternate solution, each disk page may be stored in a distinct file in the filesystem rather than as objects in the object store. This process is not efficient since the filesystem metadata corresponding to the file containing the disk page is almost as large as the disk page leading to inefficient use of storage. In addition, the filesystem directory containing the files corresponding to disk pages contains an extremely large number of files (e.g., millions to billions of files), making file access extremely slow. As such, the use of filesystems is not preferred.

Figure 2:
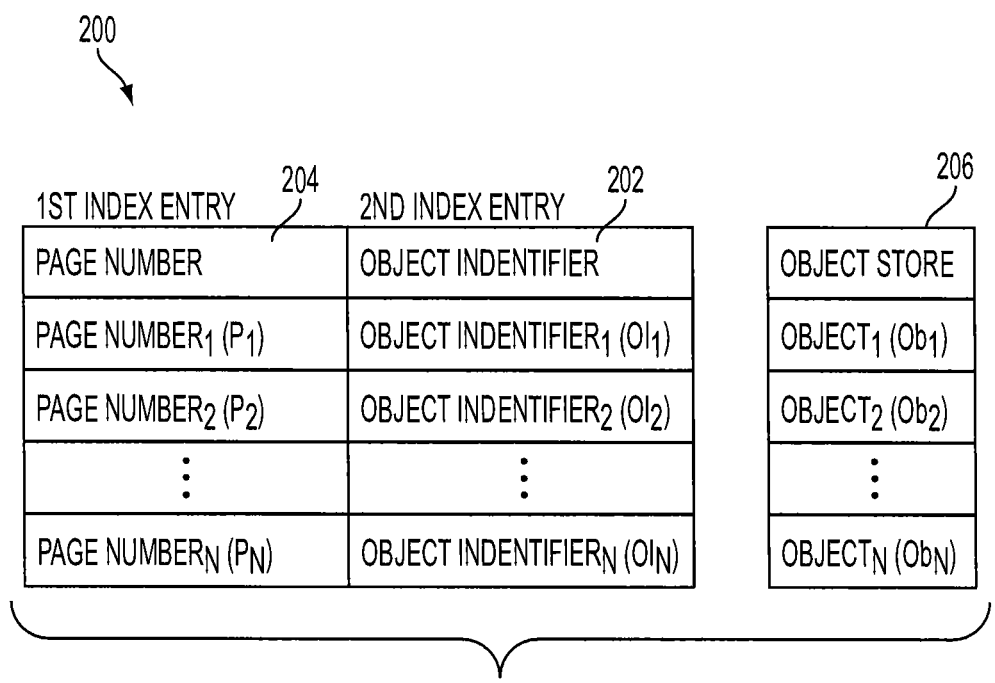
FIG. 2 illustrates an index structure of a snapshot according to an exemplary embodiment.

FIG. 2 illustrates an exemplary index structure of a snapshot. In a typical embodiment, an index structure 200 pertains to at least one snapshot 106 (illustrated in FIG. 1). In the exemplary embodiment, the index structure 200 is implemented in a table format comprising, for example, a first column 202 and a second column 204. The first column 202 represents a first index entry while the second column 204 represents a second index entry. In a typical embodiment, the first index entry associates data objects within the snapshot 106 with object identifiers ($OI_1$-$OI_n$). The second index entry identifies a location or page number of the data objects within the snapshot 106 ($P_1$-$P_n$). The object identifiers ($OI_1$-$OI_n$) and page numbers ($P_1$-$P_n$) include information useful for accessing data objects in the snapshots 106.

In a typical embodiment, data objects identified by the object identifiers $OI_1$-$OI_n$ are stored as unique objects and are further assigned unique objectstore identifiers $Ob_1$-$Ob_n$. The unique objectstore identifiers $Ob_1$-$Ob_n$ are stored in, for example, the storage device 112 (illustrated in FIG. 1). In a typical embodiment, the storage device 112 which may be an object-oriented database such as, for example, an Objectstore database. The unique objectstore identifiers $Ob_1$-$Ob_n$ are illustrated by reference numeral 206. In the example of FIG. 2, an object identifier $OI_1$ corresponds to a specific data set within the snapshot 106, while page number $P_1$ points to a location of the data set $OI_1$ within the snapshot 106. The object identifier $OI_1$ is further identified by the unique objectstore identifier $Ob_1$.

Figure 3:
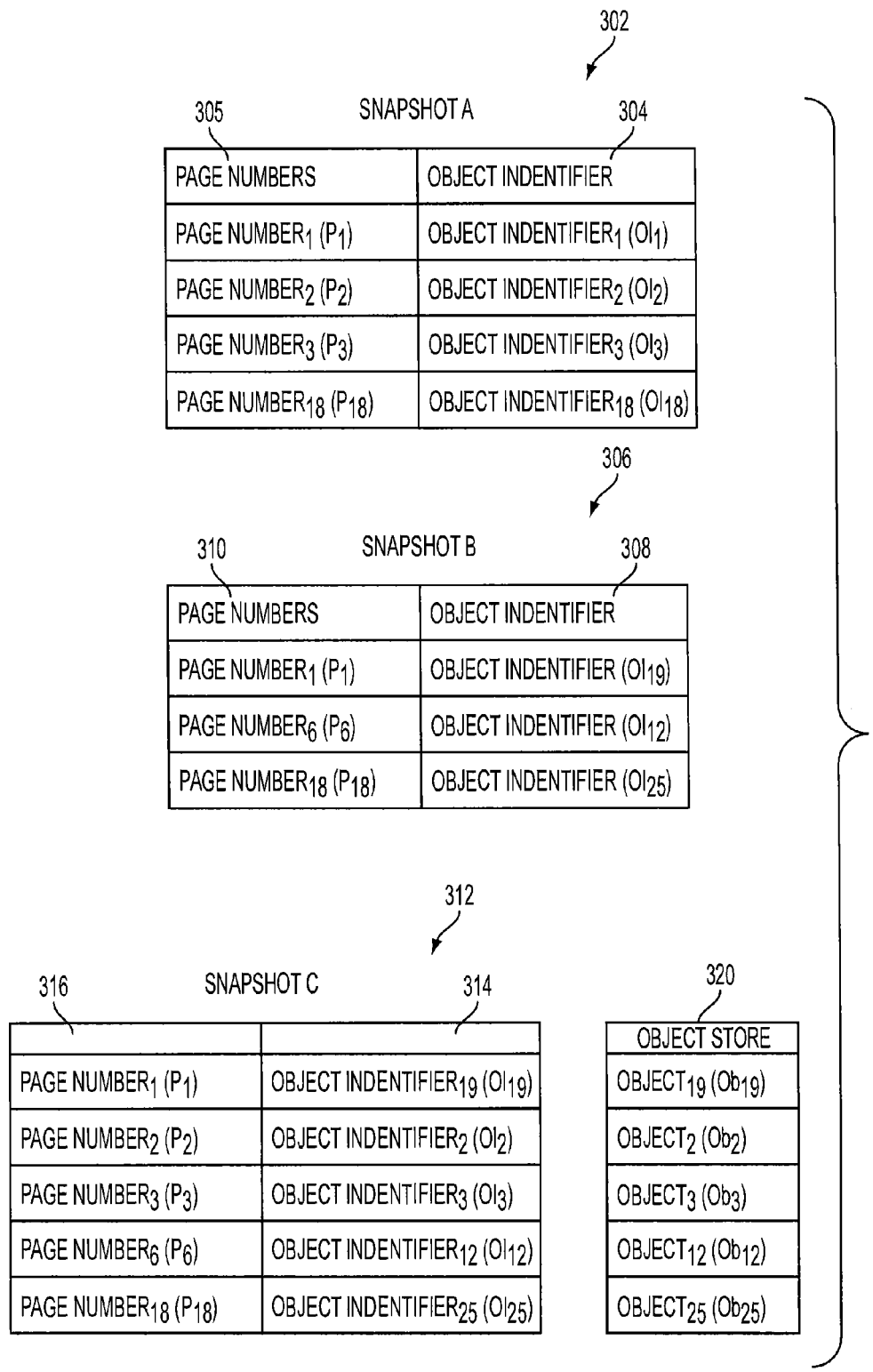
FIG. 3 illustrates a rollup operation according to an exemplary embodiment.

FIG. 3 illustrates a rollup operation according to an exemplary embodiment. In a typical embodiment, the exemplary rollup operation is performed utilizing the exemplary backup system 100. Referring now to FIGS. 1-3, snapshots A-B illustrate index structures 302, 306 in a set of consecutive snapshots. According to exemplary embodiments, snapshot A is a snapshot of data sets taken at an interval defined by the backup manager 105. The backup manager 105 may further implement a rule, policy, or set of instructions that require snapshots to be taken of the data sets that have changed since the initial snapshot A. As such, subsequent snapshot B shows only the changed data sets since the initial snapshot A.

In the exemplary embodiment, the index structure 302 is implemented in a table format comprising, for example, a first column 304 and a second column 305. The first column 304 comprises a first index entry while the second column 305 comprises a second index entry. As disclosed above relative to FIG. 2, in a typical embodiment, the first index entry 304 associates data objects within snapshot A with object identifiers ($OI_1$, $OI_2$, $OI_3$, $OI_{18}$). The second index entry 305 identifies a location or page number of the data objects within snapshot A ($P_1$, $P_2$, $P_3$, $P_{18}$). The object identifiers ($OI_1$, $OI_2$, $OI_3$, $OI_{18}$) and page numbers ($P_1$, $P_2$, $P_3$, $P_{18}$) include information useful for accessing data objects in snapshot A. For example, in snapshot A, an object identifier $OI_1$ corresponds to a data set within snapshot A, while page number $P_1$ points to a location of the data set $OI_1$ within snapshot A. In similar fashion, an object identifier $OI_2$ corresponds to a data set within snapshot A while, page number $P_2$ points to a location of the data set $OI_2$ within snapshot A. In addition, an object identifier $OI_3$ corresponds to a data set within snapshot A while, page number $P_3$ points to a location of the data set $OI_3$ within snapshot A. Furthermore, an object identifier $OI_{18}$ corresponds to a data set within snapshot A, while page number $P_{18}$ points to a location of the data set $OI_{18}$ within snapshot A. In a typical embodiment, snapshot A identifies an original copy of a data set.

In a typical embodiment, an index structure 306 pertains to snapshot B. As discussed above, snapshot B shows only the changed data sets or new data sets since the initial snapshot A. In the exemplary embodiment, the index structure 306 is implemented in a table format comprising, for example, a first column 308 and a second column 310. As discussed above, the index structure 306 of snapshot B is similar to the index structure 302 of snapshot A. The index structure 306 as illustrated by snapshot B, identifies modifications to data sets since the initial snapshot A. For example, in snapshot A, an object identifier $OI_1$ identified a data set at a location $P_1$. Snapshot B contains an updated copy of the data set $OI_1$ of snapshot A. The updated data set is now illustrated as object identifier $OI_{19}$. In addition, in snapshot A, an object identifier $OI_{18}$ identified a data set at a location $P_{18}$. Snapshot B contains an updated copy of the data set $OI_{18}$ of snapshot A. The updated data set is now illustrated as object identifier $OI_{25}$. Furthermore, snapshot B contains a new data set not originally present in snapshot A. The new data set is illustrated as an object identifier $OI_{12}$ located at a location $P_6$ within snapshot B.

In order to implement a rollup operation, the backup system 100 reads the index data in snapshots A-B, where the index data identifies data sets that have changed in snapshots A-B. For each index entry, the rollup operation identifies the snapshot that contains a latest copy of the modified data sets. In the example illustrated in FIG. 3, snapshot B illustrates data sets that have changed since the initial snapshot A. The backup system 100 updates the index data accordingly and creates a new index data which constitutes a lower resolution merged snapshot and writes out a latest copy of the data set to a new snapshot. The new snapshot is illustrated in FIG. 3 as snapshot C. As discussed above, the index structure 312 of snapshot C is similar to the index structure 302, 306 of snapshots A-B. The index structure 312 as illustrated by snapshot C, identifies a resultant snapshot in which index entries correspond to the updated object identifier and their corresponding locations.

In snapshot C of FIG. 3, an object identifier $OI_{19}$ corresponds to a data set within snapshot C, while page number $P_1$ points to a location of the data set $OI_{19}$ within snapshot C. In similar fashion, an object identifier $OI_2$ corresponds to a data set within snapshot C, while page number $P_2$ points to a location of the data set $OI_2$ within snapshot C. An object identifier $OI_3$ corresponds to data set within snapshot C, while page number $P_3$ points to a location of the data set $OI_3$ within snapshot C. An object identifier $OI_{12}$ corresponds to a data set within snapshot C, while page number $P_6$ points to a location of the data set $OI_{12}$ within snapshot C. An object identifier $OI_{25}$ corresponds to a data set within snapshot C, while page number $P_{18}$ points to a location of the data set $OI_{25}$ within snapshot C. In a typical embodiment, the rollup operation continues until all snapshot index entries in the set of consecutive snapshots A-B have been exhausted. The index structure 312 represents lower resolution merged snapshots. In a typical embodiment, object identifiers of pages that have been superseded by newer versions are deleted. For example, from the rollup operation defined above relative to snapshot A-C, object identifiers $OI_1$ and $OI_{18}$ from snapshot A that points to locations $P_1$ and $P_{18}$ are deleted.

In a typical embodiment, data objects identified by the object identifiers of snapshot C are further assigned unique objectstore identifiers $Ob_{19}$, $Ob_2$, $Ob_3$, $Ob_{12}$, $Ob_{25}$. The unique objectstore identifiers are stored in, for example, the storage device 112 (illustrated in FIG. 1). In a typical embodiment, the storage device 112 which may be an object-oriented database such as, for example, an Objectstore database. The unique objectstore identifiers $Ob_{19}$, $Ob_2$, $Ob_3$, $Ob_{12}$, $Ob_{25}$ are illustrated by reference numeral 320.

The exemplary rollup operation utilizing the exemplary backup system 100 does not require data to be read or written to achieve the rollup operation. The exemplary rollup operation is achieved by comparing index data from subsequent snapshots. Such an exemplary technique significantly reduces the number of IO operations resulting in low data retrieval time. Filesystems maintain a significant amount of metadata to track contents of each file. As such, filesystems are not suited for storing small pieces of data. In contrast to filesystems, in an object store, a fundamental unit of abstraction is an object that presents a fixed amount of data. According to exemplary embodiments, object stores provide methods to create, read, or write entire objects. By being more restrictive that filesystems, object stores require significantly less metadata to represent an object and are hence highly efficient for storing small data. Exemplary embodiments utilize object stores to create an efficient mechanism for rollup operations by eliminating the need for reading disk pages and writing them into new snapshot files.

Figure 4:
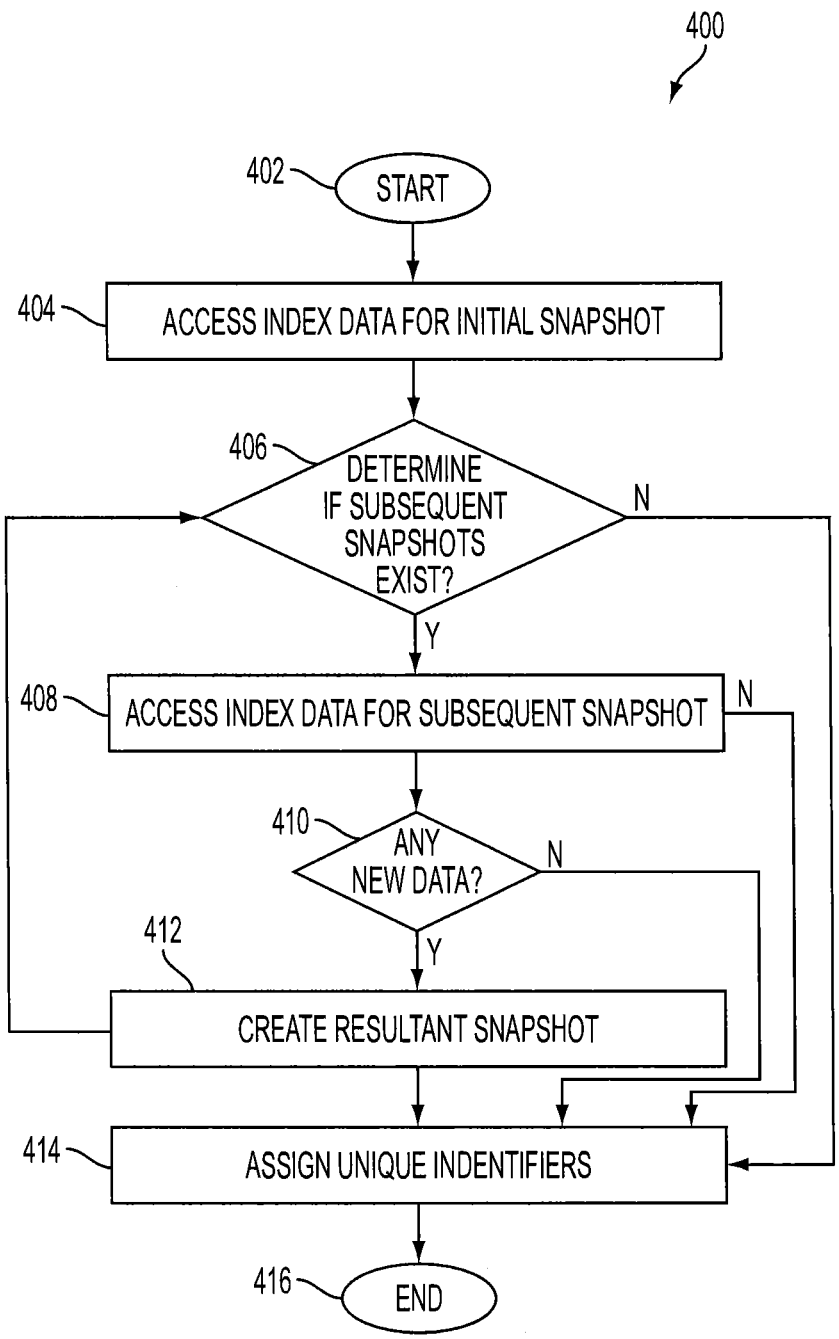
FIG. 4 is a flow diagram illustrating data rollup according to an exemplary embodiment.

FIG. 4 is a flow illustrating data rollup according to an exemplary embodiment. For illustrative purposes, the process 400 will be described in conjunction with FIGS. 1-3. The process 400 starts at step 402. At step 404, index data corresponding to an initial snapshot is accessed. For example, index data associated with snapshot A as illustrated in FIG. 3, may be, for example, index data of the initial snapshot. At step 406, the backup manager 105 determines whether subsequent snapshots exist. If it is determined at step 406 that subsequent snapshots exist, the process 400 proceeds to step 408. At step 408, index data corresponding to the subsequent snapshot is accessed. For example, index data associated with snapshot B as illustrated in FIG. 3, may be, for example, the index data of the subsequent snapshot.

At step 410, the backup manager 105 determines whether the index data in the subsequent snapshot (snapshot B) has changed since the initial snapshot (snapshot A). If it is determined at step 410 that the index data has changed, the process 400 proceeds to step 412. At step 412, backup system 100 updates the index data accordingly and creates a new index data which constitutes a lower resolution merged snapshot. The backup system 100 writes out a latest copy of the data set to a new snapshot (snapshot C) at step 412. The new snapshot is illustrated in FIG. 3 as snapshot C. Snapshot C, identifies a resultant snapshot in which index entries correspond to the updated object identifier and their corresponding locations. In a typical embodiment, object identifiers of pages that have been superseded by newer versions are deleted. For example, from the rollup operation of FIG. 3 relative to snapshot A-C, object identifiers $OI_1$ and $OI_{18}$ from snapshot A that point to locations $P_1$ and $P_{18}$ are deleted. From step 412, the process 400 proceeds to step 406. At step 406, the backup manager 105 determines whether subsequent snapshots exist.

However, if it is determined at step 406 that no subsequent snapshots exist, the process 400 proceeds to step 414. At step 414, the data objects identified by the object identifiers of snapshot C are further assigned unique objectstore identifiers by the backup system 100. However, if it is determined at step 410 that the index data in subsequent snapshot has not changed since the initial snapshot, the process 400 proceeds to step 414. After the object identifiers of snapshot C are further assigned unique objectstore identifiers, the process 400 ends at step 416.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components It is thus believed that the operation and construction of embodiments of the present invention will be apparent from the foregoing description. While the method and system shown or described have been characterized as being pre-

What is claimed is:

1. A method of managing backup data, the method comprising:
accessing, via a backup manager, index data of an initial snapshot;
accessing, via the backup manager, index data of a subsequent snapshot;
determining, via the backup manager, whether the index data of the subsequent snapshot is different from the index data of the initial snapshot;
responsive to a determination that the index data of the subsequent snapshot is different from the index data of the initial snapshot, creating an updated index data;
creating an updated snapshot with the updated index data, wherein the index data and the updated index data comprise object identifiers and location identifiers;
assigning objectstore identifiers to the object identifiers, wherein the object identifiers corresponding to data sets are further identified by the objectstore identifiers; and
wherein the updated index data correspond to an updated data set within the updated snapshot.

2. The method of claim 1, wherein the initial snapshot includes a first replica of a data set taken at a first predetermined time.

3. The method of claim 2, wherein the subsequent snapshot includes a second replica of the data set taken at a second predetermined time.

4. The method of claim 3, wherein the second predetermined time occurs after the first predetermined time.

5. The method of claim 3, wherein the second replica illustrates the data set that has changed since the first replica.

6. The method of claim 1, wherein the updated snapshot is a resultant of the initial snapshot and the subsequent snapshot.

7. The method of claim 1, wherein the object identifiers correspond to a data set within at least one of the initial snapshot, the subsequent snapshot, and the updated snapshot.

8. The method of claim 1, wherein the location identifiers point to a data set within at least one of the initial snapshot, the subsequent snapshot, and the updated snapshot.

9. The method of claim 1, wherein the index data comprises information for accessing data sets in at least one of the initial snapshot, the subsequent snapshot, and the updated snapshot.

10. An information handling system comprising:
a backup manager comprising a processor interoperably coupled to a client computer and adapted to provide instructions to take an initial snapshot and a subsequent snapshot of data sets at predetermined intervals and create an initial index data and a subsequent index data; and
wherein the processor of the backup manager accesses the initial index data and the subsequent index data and creates an updated snapshot and an updated index data responsive to a determination that the subsequent index data is different from the initial index data;
wherein the initial index data and the subsequent index data comprise object identifiers and location identifiers;
wherein the object identifiers are further assigned objectstore identifiers, wherein the object identifiers corresponding to data sets are further identified by the objectstore identifiers; and
wherein the updated index data correspond to an updated data set within the updated snapshot.

11. The system of claim 10, wherein the backup manager comprises an indexing service module and an index database.

12. The system of claim 10, wherein the backup manager is implemented as at least one of a computer code, a hardware device and a software/hardware combination.

13. The system of claim 10, wherein:
the client comprises a data agent; and
the data agent retrieves data from an information store.

14. The system of claim 13, wherein the data agent is implemented as at least one of a computer code, a hardware device and a software/hardware combination.

15. The system of claim 10 further comprising an object-oriented database.

16. The system of claim 10, wherein the updated snapshot is a resultant of the initial snapshot and the subsequent snapshot.

17. An article of manufacture for managing backup data, the article of manufacture comprising:
at least one computer readable medium;
processor instructions contained on the at least one computer readable medium, the processor instructions configured to be readable from the at least one computer readable medium by at least one processor and thereby cause the at least one processor to operate as to perform the following steps:
accessing, via a backup manager, index data of an initial snapshot;
accessing, via the backup manager, index data of a subsequent snapshot;
determining, via the backup manager, whether the index data of the subsequent snapshot is different from the index data of the initial snapshot;
responsive to a determination that the index data of the subsequent snapshot is different from the index data of the initial snapshot, creating an updated index data;
creating an updated snapshot with the updated index data, wherein the index data and the updated index data comprise object identifiers and location identifiers;
assigning objectstore identifiers to the object identifiers, wherein the object identifiers corresponding to data sets are further identified by the objectstore identifiers; and
wherein the updated index data correspond to an updated data set within the updated snapshot.

* * * * *